US006234970B1

(12) United States Patent
Nevo et al.

(10) Patent No.: US 6,234,970 B1
(45) Date of Patent: May 22, 2001

(54) METHOD AND APPARATUS FOR CARDIOLOGIC ECHO-DOPPLER IMAGE ENHANCEMENT BY GATED ADAPTIVE FILTERING IN TIME DOMAIN

(75) Inventors: Erez Nevo, Baltimore, MD (US); Abraham Roth, Kefar Hasidim (IL)

(73) Assignee: Robin Medical Technologies, Ltd., Nesher (IL)

( * ) Notice: Subject to any disclaimer, the term of this patent is extended or adjusted under 35 U.S.C. 154(b) by 0 days.

(21) Appl. No.: 09/180,538

(22) PCT Filed: May 28, 1997

(86) PCT No.: PCT/US97/09455
§ 371 Date: Nov. 10, 1998
§ 102(e) Date: Nov. 10, 1998

(87) PCT Pub. No.: WO97/45058
PCT Pub. Date: Dec. 4, 1997

Related U.S. Application Data
(60) Provisional application No. 60/018,466, filed on May 28, 1996.

(51) Int. Cl.[7] .................................................. A61B 8/00
(52) U.S. Cl. .............................................................. 600/453
(58) Field of Search ................................... 600/455, 441, 600/458, 453, 454

(56) References Cited

U.S. PATENT DOCUMENTS

| 4,887,306 | 12/1989 | Hwang et al. . | |
|---|---|---|---|
| 5,235,984 | 8/1993 | D'Sa . | |
| 5,409,010 | * 4/1995 | Beach et al. | 600/455 |
| 5,415,171 | 5/1995 | Goh et al. . | |
| 5,450,850 | * 9/1995 | Iinuma | 600/455 |
| 5,883,613 | * 11/1998 | Averkiou et al. | 600/458 |

* cited by examiner

Primary Examiner—Marvin M. Lateef
Assistant Examiner—Maulin Patel

(57) ABSTRACT

A method of enhancing the image quality of cardiologic and general untrasound echo-doppler apparatus by finite memory, ECG-gated and/or breathing gated filtering of the acquired image. The acquired scans are time-gated by the cardiac contraction cycle, or by the breathing cycle to account for cardiac deformation due to contraction or relaxation, and to cardiac movements due to lung inflation or deflation, or to cardiac-induced pulse of perfusion in non-cardiac organs and tissues. The gated scans are recursively filtered with saved images, which are processed scans of previous cardiac and/or breathing cycles. The resulting images are displayed and also saved for the next cycle filtering process.

10 Claims, 2 Drawing Sheets

METHOD AND APPARATUS FOR CARDIOLOGIC ECHO-DOPPLER IMAGE ENHANCEMENT BY GATED ADAPTIVE FILTERING IN TIME DOMAIN

This appln. is a 371 of PCT/US97/09455 filed May 28, 1997, and also claims benefit of Provisional No. 60/018,466 filed May 28, 1996.

BACKGROUND OF THE INVENTION

Echo-doppler is commonly applied for non-invasive imaging of the heart. Commercially available systems provide the user with several imaging modalities: 2D two-dimensional) image of a single plane through the heart; m-mode image of a single line through the heart; doppler image of a flow in a specific location (pulsed doppler) or in any location along a line (continuous doppler); color-doppler image which consists of superimposing information of flow direction and velocity on 2D image; and tissue-doppler imaging which provides tissue deformation data on a 2D image. Three-dimensional imaging of the heart, which currently provides off-line reconstruction of the heart from sequentially acquired multi-plans of the heart may soon provide real-time imaging of the heart.

A main limitation in the clinical application of echo-doppler imaging is the image quality. While about 20–30% of the studies have good technical quality and do not require image enhancement, about 40–60% are acceptable studies which can be enhanced to get more accurate evaluation, and about 20–30% are technically poor and usually do not provide the required image quality.

This limitation is either overcome by using oesophageal imaging, rather than the standard trans-thoracic imaging, or by using echo-contrast media which are injected intravenously. These techniques significantly improve the image quality but are semi-invasive and can only be used in a limited number of studies.

Accordingly, there exists a need for a system that will provide for image enhancement of trans-thoracic studies that can significantly improve the accuracy of echo-doppler imaging in the majority of studies which provide images that can be analyzed but need more time to optimize the image and to get the required clinical data.

OBJECTS AND SUMMARY OF THE INVENTION

It is therefore an object of the present invention to provide a method and apparatus for image enhancement in cardiologic applications of echo-doppler imaging.

It is another object of the present invention to improve the image quality of the technically poor studies sufficiently to get the required data and to avoid the use of the semi-invasive trans-oesophageal and echo-contrast techniques.

Yet another object of the present invention is to enhance perfusion studies of the heart or other organs which are currently done with contrast-enhanced echo-doppler imaging.

According to the present invention, repetitive physiologic phenomena—the heart contraction/relaxation cycle and/or the breathing inspiration/expiration cycle, are divided into "m" equal sequences. Factors that determine "m" include the length of the physiologic cycle, the scanning rate of the echo-doppler apparatus, the image area to be enhanced and the amount of available memory in the processing apparatus. Typically, "m" equals 20–40. The image acquired during each sequence represents the heart shape at the specific time of the measurement with respect to a fixed reference point in the physiologic cycle (e.g. the initiation of heart contraction, signaled by the R-wave of the ECG, or the initiation of the breathing cycle, signaled by the initial portion of inspiration). This image is to be filtered with previous images at the same time, relative to the reference point, that were acquired in previous physiologic cycles. Thus the change of the heart shape due to these physiologic phenomena is eliminated and the images can be filtered to get an improved image.

The improved image is displayed on the monitor (either with the acquired raw image or as substitute) and is saved for filtering with future images. A simple embodiment of this filtering is weighted averaging, where the newly acquired image is multiplied by a certain factor, the image saved during previous cycles is multiplied by another factor and the two results are summed. The multiplying factors (the multipliers) determine the "memory" of the algorithm, or the effect of previous images versus the effect of the newly acquired image, and can be controlled by the operator.

More complex filtering requires more memory which can be used to save several weighted past images, and thus the newly acquired image can be filtered with several previous images. This approach can be applied with all modes of commercial echo-doppler systems, namely 2D, m-mode, doppler, color-doppler, tissue-doppler and 3D imaging.

The same approach can be used for perfusion studies of any organ in the body. Due to the pulsatile pattern of blood flow and pressure in the body, gating to the R-wave of the ECG enhances the quality of the perfusion images and may allow quantitated analysis of perfusion pulsatility in any organ. This may assist the delineation of abnormal tissue, for example a tumor, from neighboring normal tissue.

The invention also provides apparatus to enable the application of the described method either as an add-on device for commercial echo-doppler systems or as a built-in module for future echo-doppler systems. The apparatus comprises an interface to acquire the image from the echo-doppler system (e.g. video frame grabber), an interface to get the physiologic cycling signal (e.g. the ECG raw signals which can be processed to provide both heart contraction timing and breathing timing or the ECG tracing which is commonly recorded as part of the echo-doppler display), memory modules to save the gated images, user interface to control parameters of the algorithm (e.g. the multipliers for weighted averaging), micro-processor for mathematical processing of the imaging (e.g. array processor), and an interface to present the enhanced image (e.g. an additional screen or interface to the echo-doppler screen).

DETAILED DESCRIPTION OF THE PREFERRED EMBODIMENT

Figure 1:
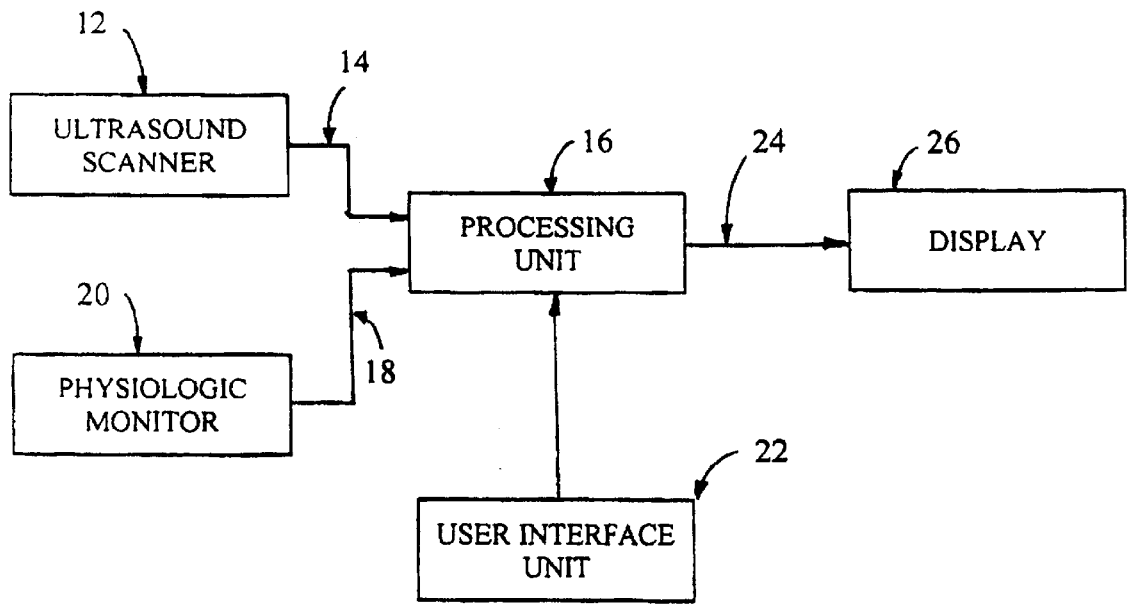
FIG. 1 is a schematic diagram of the proposed system according to the present invention.

Referring now to FIG. 1, there is illustrated an ultrasonic echo-doppler scanner 12 which provides raw scanned images 14 of the heart that are provided to a processing unit 16, where they are stored. A physiologic signal 18, such as the R-wave of the ECG, is provided by physiologic monitor 20 to the processing unit 16. Physiologic monitor may be an external device, such as an ECG monitor, or a software module for the extraction of the ECG tracing from the echo-doppler display.

Signal 18 provides a timing-gating signal through which the ultrasonic image 14 is received by processing unit 16, i.e., each image is tagged with a specific time in cycle with reference to a physiological reference point. A total of "m" tagged images are created if the physiological cycle is divided into "m" sequences.

Various user controls, employing the parameters of an image enhancement algorithm, are set by the user through a user interface unit 22. The scanned raw images 14 are processed in real-time to enhance the image quality to provide an enhanced image 24 which is provided to display 26 for viewing. The "m" processed images are displayed on display 26 with their corresponding times in reference to the physiological reference point.

Figure 2:
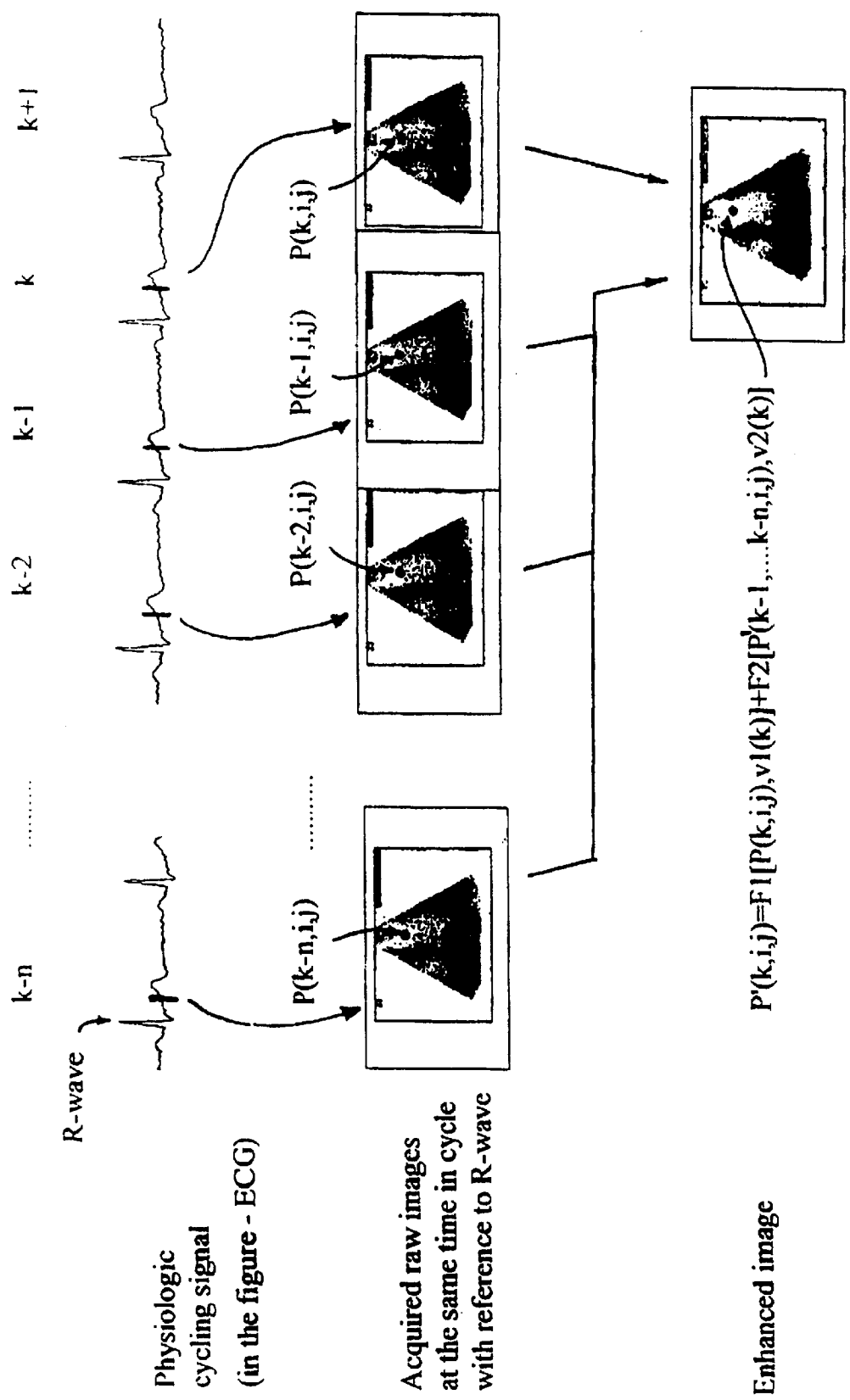
FIG. 2 describes the physiologic cycling phenomena—the heart contraction cycle and the breathing cycle, and the implementation of the algorithm.

The image enhancement algorithm is schematically presented in FIG. 2. The acquired image 14 at a specific time in reference to a reference point of the physiologic signal 18 (e.g. the R-wave of the ECG) is denoted as image k. Taking each pixel (i,j) of the image k, denoted by P(k,i,j), the new value for the pixel, denoted by P'(k,i,j), can be calculated as being a combination of a function F1 of the current pixel value and a function F2 of the pixel value in n previous images (denoted by P'(k–1 . . . k–n,i,j)). These images are from previous physiologic cycles taken at the same time with reference to the physiological reference point. The function F1 is determined by a set of parameters contained in a vector v1(k), and the function F2 is determined by another set of parameters contained in a vector v2(k). The parameters in the vectors v1(k) and v2(k) can be either fixed values or changing according to the nature of the image (adaptive parameters).

The image enhancement algorithm can be written according to the following formula:

$$P'(k,i,j)=F1[P(k,i,j),v1(k)]+F2[P'(k-l, \ldots k-n,i,j),v2(k)]$$

The processed image consisting of all the processed pixels P'(k,i,j) is displayed to the user as an enhanced image on display 26 which is either presented in addition to the raw image 14 or substituted for the latter. The same process is applied individually to all "m" images that comprise a complete physiological cycle, so that an enhanced, real-time dynamic image results.

The same approach can be used for enhancement of perfusion imaging of the heart or any other organ or tissue in the body. Although most non-cardiac organs do not move with the heart cycle, the blood flow and blood pressure varies with time, synchronized with heart contraction. Perfusion studies are performed by injecting echo-contrast material into the blood which enhances the contrast between blood and other tissues and thus demonstrate different levels of blood perfusion into the same tissue. Gating the acquired images to the R-wave of the ECG enables the enhancement, through averaging of the image without losing the variation of image intensity due to pulsatility-induced changes in blood volume in the scanned tissue.

An equivalent approach is used with m-mode and doppler imaging, but the enhancement is applied on columns of pixels rather than the whole 2D image. Consequently, each new column of pixels is filtered with n previous columns which were acquired at the same time in reference to the reference point of the physiologic signal.

The user can control the parameters of the vectors v1 and v2 through user interface 22. Possible controls may include the use of adjustable slide bars (not shown) that can be moved to determine the required level of each parameter or through a software interface by using a mouse or other keyboard buttons to change values on a computer screen.

The following is a description of one manner of using the system, based on weighted averaging of the image, to enhance the acquired image during a routine echo study.

The user positions the sensing portion of the ultrasonic scanner 12 in a certain "echo window" which provides the required image of the heart. Initially, a slide bar which determines the level of the parameter v2 which is the weighing factor for previous images is set to zero level, so the processed image is identical to the raw image. Once the user is satisfied with the position of the transducer and the acquired image, the user slides the bar to gradually increase the level of the parameter v2. The larger the parameter is, the larger the effect of the prior images on the processed image (the image memory is longer). Obviously, the longer the period of time where the transducer is held in a fixed position and the scanned image does not move, more images will be averaged and the image quality will improve. However, since time is a limiting factor in clinical studies and since as the memory becomes longer the effect of additional images become smaller, there is an optimal level for the parameters v1, v2, which may result in optimal image within a reasonable time. Although it will be subjected to the experience and preferences of the user, a reasonable image enhancement of the contracting heart can be obtained by recursively averaging 10–25 heart cycles when the scanned subject is asked to hold breathing. This theoretically may result in improvement of the signal to noise ratio by a factor of 2–5, depending on the level of the parameters v1, v2. If the gating is on both the heart cycle and breathing cycle, longer scans can be averaged until a satisfactory image is obtained.

For perfusion studies, after injection of the contrast media and achieving the required image of the organ, the operator will typically set the parameters of v1, v2 to a long memory setup and continue a steady state imaging for the required time to achieve the required level of image enhancement. Longer periods of up to several minutes may achieve the best results by eliminating the effect of breathing on organ position and blood flow fluctuation.

It will thus be seen that the illustrated apparatus and method can be used for the enhancement of the image quality of routine echo-doppler imaging of the heart. The present invention may improve the resulting images in most studies performed so that more accurate measurement and analysis can be done. In some cases it may provide sufficient image quality to avoid the use of semi-invasive methodologies which are currently required when the trans-thoracic image is technically poor. In other cases, the apparatus and method can be used with contrast echo to enhance the quality and expand clinical applications of blood perfusion studies. The apparatus is simple to use and the operation of the method does not require significantly more time than is currently required to get a high quality image for measurements and analysis. The invention can be also applied during exercise echo-cardiography, where the image quality is usually limited and complicates the real-time monitoring and the off-line analysis of the study.

While a particular system has been described above in conjunction with FIGS. 1 and 2 for generating an enhanced echo-doppler image, the invention is not limited to the specific system disclosed and other systems performing these functions are within the contemplation of the invention. Thus, while the invention has been particularly shown and described above with reference to a preferred embodiment, the foregoing and other changes in form and detail may be made therein by one skilled in the art while still remaining within the spirit and scope of the invention.

What is claimed is:

1. An echo-doppler image enhancement system, comprising:

a processing unit for receiving and storing scanned ultrasonic images, physiologic signals and a filtering input;

ultrasonic means for providing scanned ultrasonic images of an organ of a subject of said unit;

a physiologic sensor for providing said physiologic signal of the subject for gating said scanned ultrasonic images so that said images are tagged by a specific time within a physiologic cycle with reference to a physiologic reference point when they are received by said unit;

means coupled to said processing unit for providing said filtering input for modifying said gated ultrasonic image according to a filter applied on a set of said images from different physiologic cycles at the same specific time within a physiologic cycle to enhance the ultrasonic image; and display means coupled to said processing unit for receiving and displaying said enhanced ultrasonic image.

2. An echo enhancement system according to claim 1, wherein said organ is the heart and said physiologic cycle is the cardiac cycle.

3. An echo enhancement system according to claim 1 wherein said organ is any organ of the body which is studied with ultrasonic contrast media.

4. An echo enhancement system according to claim 1, wherein said filtering input operates according to the following formula:

$$P'(k,i,j)=F1[P(k,i,j),v1(k)]+F2[F2[P'(k-l, \ldots k-n,i,j),v2(k)]$$

wherein P' is the enhanced image, P is the raw scanned image, k indexes the physiologic cycle, i and j index the pixel location, v1 and v2 are user defined vectors defining the nature of the applied filtering of the image.

5. An echo enhancement system according to claim 1, wherein said physiologic cycle is the breathing cycle.

6. A method of enhancing an echo-Doppler image comprising the steps of:

detecting an ultrasonic image of a structure to be displayed;

gating said ultrasonic image with a physiologic signal so that each image is tagged with a specific time within a physiologic cycle with reference to a physiologic reference point;

recursively filtering a set of said gated images from different physiologic cycles at the same specific time with the physiologic cycle by combining a weighted real time image with previously weighted images to create an enhanced image said gating and said filtering being performed on "m" different images that are acquired during a complete cycle of said physiologic signal; and displaying said enhanced "m" in their tagged times with reference to said physiologic reference point.

7. A method of enhancing an echo-Doppler image according to claim 6, wherein said physiologic signal is an electrocardiogram of the heart and said physiologic cycle is a cardiac cycle.

8. A method of enhancing an according to claim 6, wherein said step of recursively filtering said gated image operates according to the following formula:

$$P'(k,i,j)=F1[P(k,i,j),v1(k)]+F2[F2[P'(k-l, \ldots k-n,i,j),v2(k)]$$

wherein P' is the enhanced image, P is the raw scanned image, k indexes the physiologic cycle, i and j index the pixel location, v1 and v2 re user defined vectors defining the nature of the applied filtering of the image.

9. A method of enhancing an echo doppler image according to claim 6 wherein said image is an image of any organ or tissue in the body that is studied with ultrasonic contrast media.

10. A method of enhancing an echo-Doppler image according to claim 6, wherein said physiologic signal is a pneumogram and said physiologic cycle is the breathing cycle.

* * * * *